INVENTOR/S
DONALD F. TURNER &
RONALD L. WEBSTER
BY Melville, Strasser, Foster and Hoffman
ATTORNEYS Oct. 13, 1970     D. F. TURNER ET AL     3,533,571
BREAK DOWN REEL
Filed Oct. 28, 1968     5 Sheets-Sheet 2

INVENTOR/S
DONALD F. TURNER &
RONALD L. WEBSTER

BY *Melville, Strasser, Foster and Hoffman*
ATTORNEYS

INVENTOR/S
DONALD F. TURNER &
RONALD L. WEBSTER

BY *Melville, Strasser, Foster and Hoffman*
ATTORNEYS

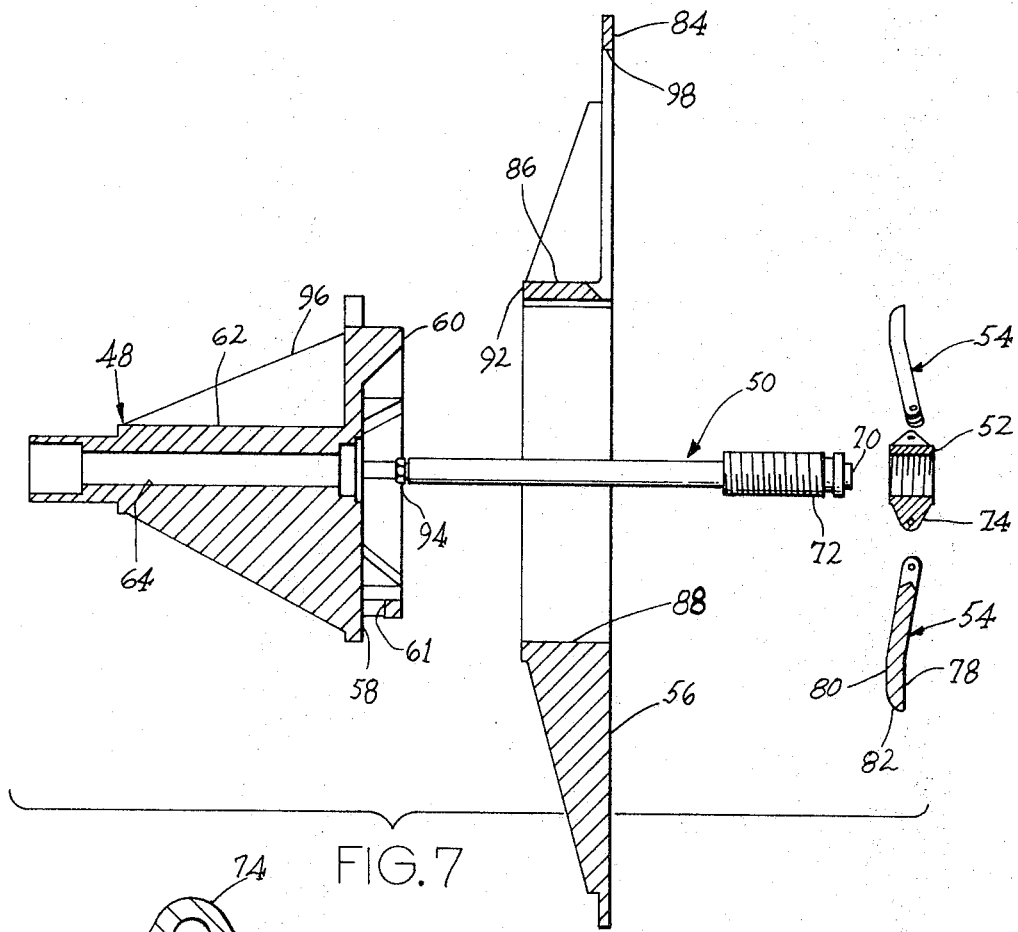
FIG. 7
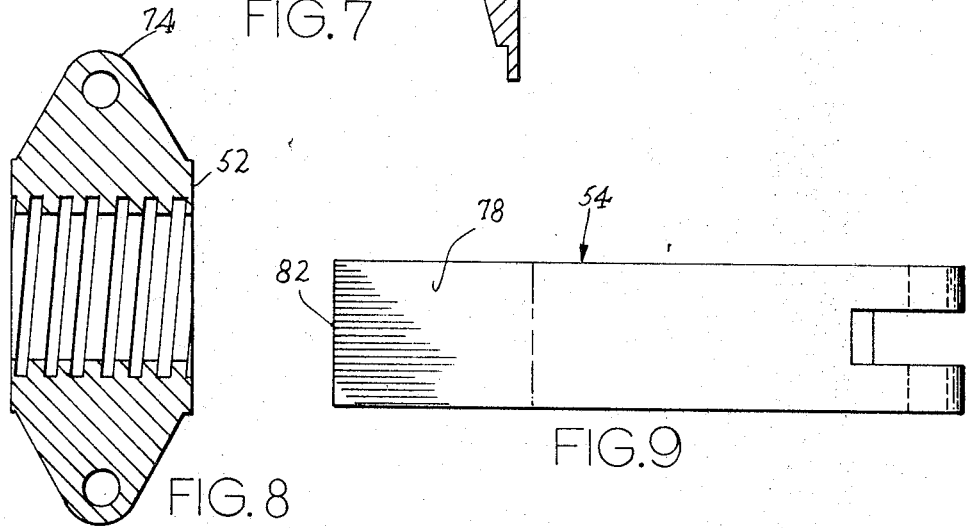
FIG. 8
FIG. 9

INVENTORS
DONALD F. TURNER &
RONALD L. WEBSTER

United States Patent Office 3,533,571
Patented Oct. 13, 1970

3,533,571
BREAK DOWN REEL
Donald F. Turner, Arvada, Colo., and Ronald L. Webster, Kansas City, Mo., assignors to Armco Steel Corporation, Middletown, Ohio, a corporation of Ohio
Filed Oct. 28, 1968, Ser. No. 771,104
Int. Cl. B65h 75/14, 75/22
U.S. Cl. 242—77
7 Claims

ABSTRACT OF THE DISCLOSURE

A break down reel for coiling and packaging coiled products such as wire comprising a spool having a flange secured to one end thereof, an extension on the opposite end of the spool for slidably engaging a second flange, said extension containing a plurality of radial apertures communicating with a central bore therethrough, and a threaded shaft disposed within said bore and operable to move a series of radio abutting means into and out of said apertures to hold and/or release said second flange from engagement with said spool.

BACKGROUND OF THE INVENTION

There has been a long felt need in the wire industry, and in other industries where coiled products are involved, for a fast and easily operated break down reel. Such systems are used in preparing the coated, stranded or otherwise processed product for coiling and packaging for shipment in coiled form. Since a typical product utilizing the device noted above is a strand of wire to be coiled, the further description herein will be so limited. However, it should be understood that the invention to be more completely described is applicable to a variety of coiled products. Therefore, no restriction is intended to be imposed on the invention in this regard.

In the present wire industry, as in most all industries, satisfactory and expedient packaging and shipping of the industries' product is a vital factor in the cost and marketing pictures. Unsightly or carelessly prepared packages affect the marketability of the product, while time consuming operations in the final stages of shipping directly affect the cost, and therefore the profit picture.

While satisfactory packaging had been the lesser of the two problems, no expedient way had evolved until the present invention whereby a material reduction in time was introduced into the operation. The typical break down reel used by the prior art consisted of a spool having a fixed and a movable flange. In order to remove the coiled product from the spool, a series of bolts, threaded nut, or similar fastening means had to be removed before the flange could be disengaged from the spool. This operation, as practiced in the wire inudstry, required a number of operators or helpers for a period of time. By the present invention, a large reduction in total man-hours was realized.

In accordance with the above, a principal object of this invention is the provision of a unique break down reel requiring a minimum of time and effort to satisfactorily coil and package coiled products for shipment.

SUMMARY OF THE INVENTION

Briefly in the practice of this invention, a system has been devised whereby the time and effort for coiling and packaging a coiled product has been reduced. This is achieved by a device comprising a spool having a fixed flange at one end and a removable flange at the other. Specifically, the novelty herein resides in the simple manner in which the removable flange is held in place about the spool.

The fixed flange end or first end of the spool may be provided with a drive gear which effects the coiling or reeling action of the device.

The opposite end of the spool is provided with an extension, the circumferential extent of which is slightly less than the circumferance of the spool. For convenience, this spool extension may be described as the hub and is essentially cone shaped, the base of which defines the end of the spool. Recessed from the peripheral extent of said base and projecting within the spool is an annular flange or retainer ring which is provided with a plurality or radial apertures through which abutting means may be moved.

The final major element of the device is the removable flange which is circular in configuration and contains a central opening sufficient to slide over said extension. Extending into said opening in a spoke-like fashion are a series of small projections which engage with channel members forming the circular extent of said spool. The axial dimension of the removable flange is such that when the small projections are seated in their respective channels, the abutting means may be moved into position through the radial apertures in the annular flange into abutting engagement with a portion of the flange. This motion of the abutting means is accomplished through a threaded shaft disposed in a central bore of the extension and communicating with the aforementioned radial apertures.

By this arrangement, particularly from the more complete description to follow, it should be evident that as said threaded shaft is turned, the abutting means will be moved from one posiition to another, i.e., recessed to abutting, or inoperative to operative.

BRIEF DESCRIPTION OF DRAWINGS

FIG. 7 is an exploded sectional view of the component shown at the left of FIG. 1.
FIG. 8 is an enlarged sectional view of the pawl.
FIG. 9 is a top view of the arms which are pivotally mounted on the pawl.

DETAILED DESCRIPTION OF THE INVENTION

Figure 1:
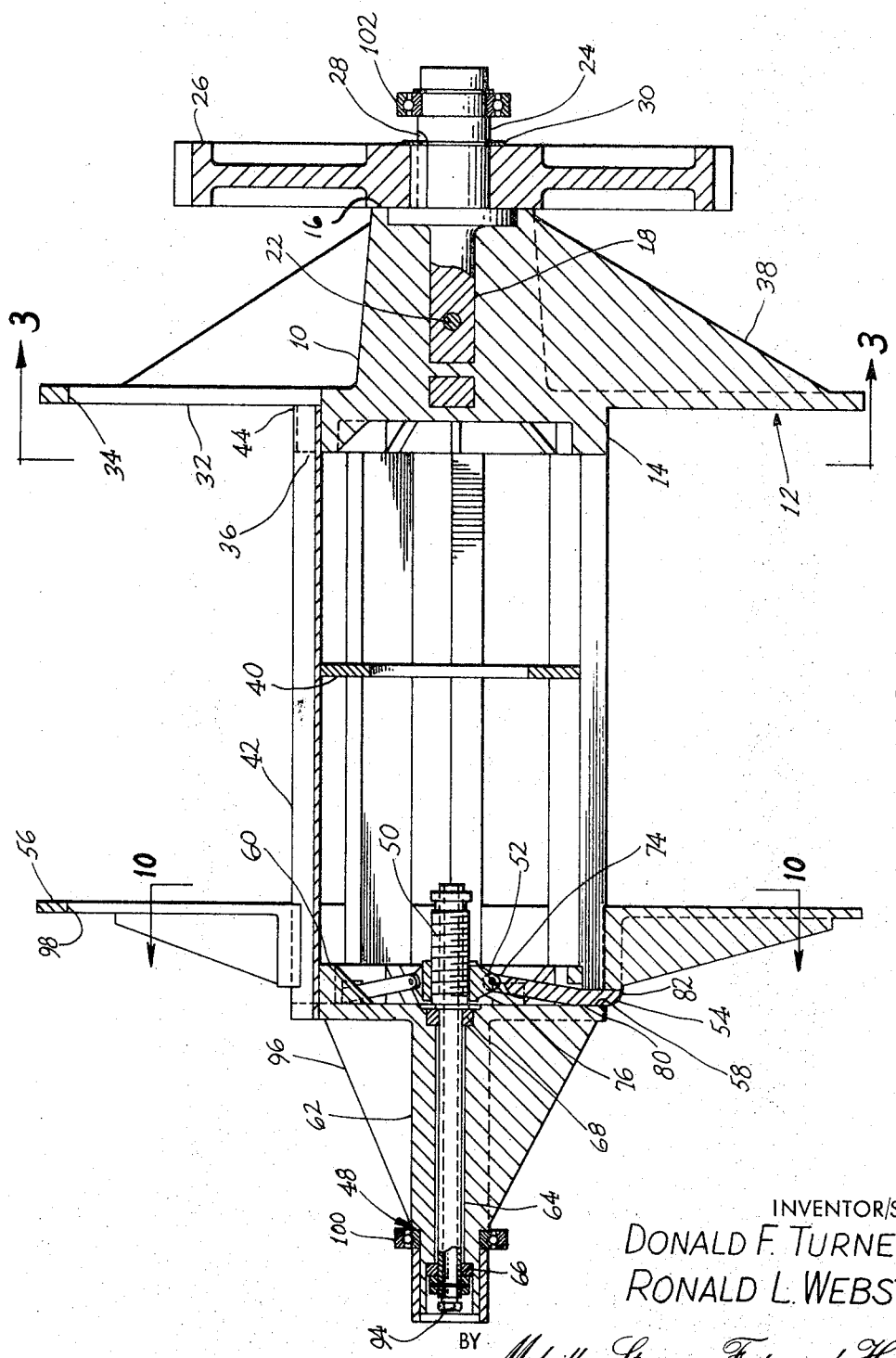
FIG. 1 is a sectional view of the reel assembly constructed in accordance with the present invention.

Turning now to a more complete description of the preferred embodiment, it will be seen from FIG. 1 that the apparatus of this invention comprises three primary members, namely, the fixed flange-drive side, the center spool, and the removable flange and its mechanism. While the novelty of this invention resides in the latter member, it is believed that a brief description of each will aid in a fuller understanding of the break down reel found so effective in minimizing the time and effort to coil and package coiled products.

Figure 2:
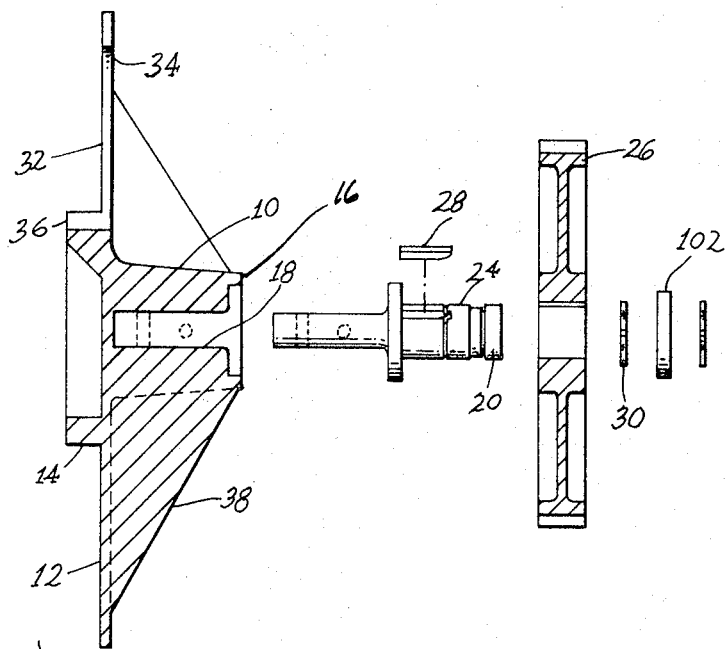
FIG. 2 is an exploded sectional view of the components shown on the right side of FIG. 1.
Figure 3:
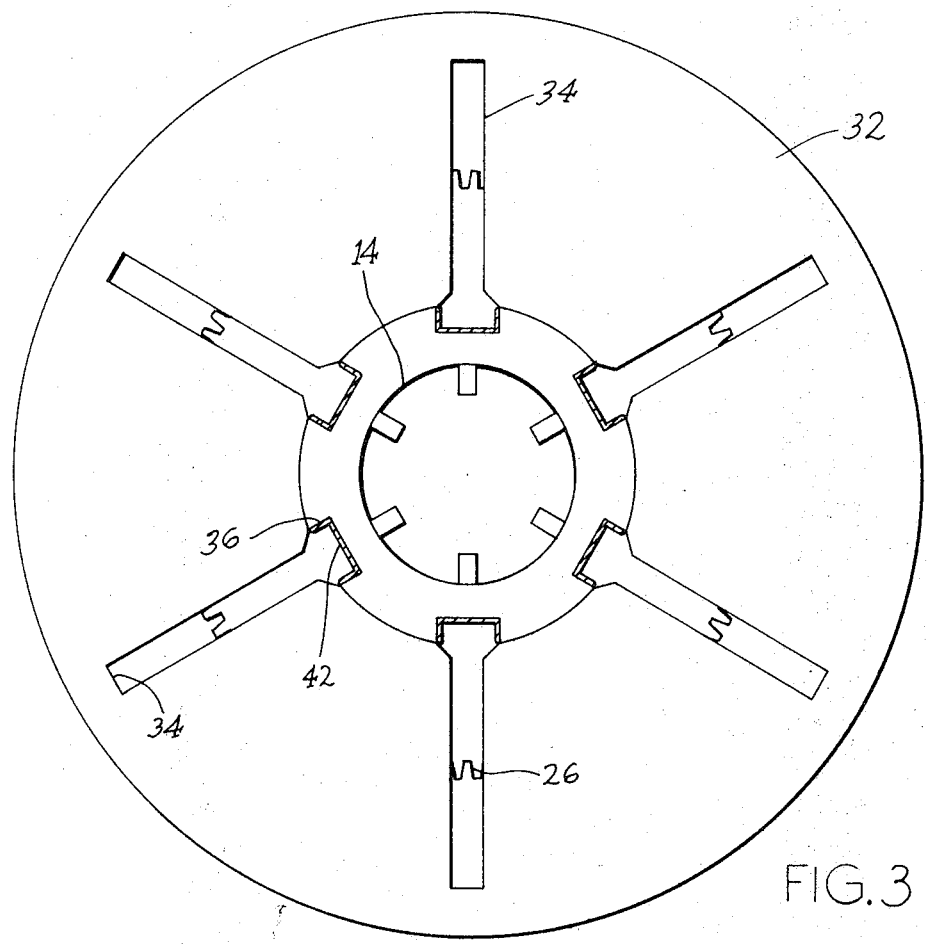
FIG. 3 is a sectional view taken along the line 3—3 of FIG. 1.

Considering now the several components of this unique apparatus, FIGS. 2 and 3 represent the member described above as the fixed flange-drive side. Said member comprises a housing 10 having a flange portion 12 and a hub 14. While the housing is shown as an integral member, such as produced in a casting, it should be understood that such a member may be fabricated from plate and tubular products. However, for convenience the following description will be with regard to the preferred structure.

The opposite end 16 of the hub portion 14 is provided with a bore 18 adapted to receive drive shaft 20. The shaft, at its narow end, is affixed to the hub end 16 by means of the pin 22 or by other means well known in the art. As an alternative, the shaft may be integral with the hub. The broad end 24 of said shaft is provided with a suitable spur gear 26 keyed at 28 so as to rotate the shaft, and hence the reel. A snap ring, such as illustrated at 30, may be used to maintain the axial position of gear 26. The provision of the spur gear depends on whether the assembly is to be used as a take-up reel or pay-off reel. For instance, in the latter case, the spur gear would not be used.

The sectional view illustrated in FIG. 3 shows the inside face 32 of flange 12. It will be observed that the flange 12 has been provided with a series of radial slots 34, which, as will be seen later, are used for strapping or banding the coiled products.

The slots 34 are aligned with channel recesses 36 whose function will be discussed hereinafter. Since the slots 36 merely segment the flange into a plurality of pie-shaped pieces, a series of backing supports 38 are provided. These are particularly valuable as the coil builds up on the reel exerting pressure against the flange 12.

Figure 6:
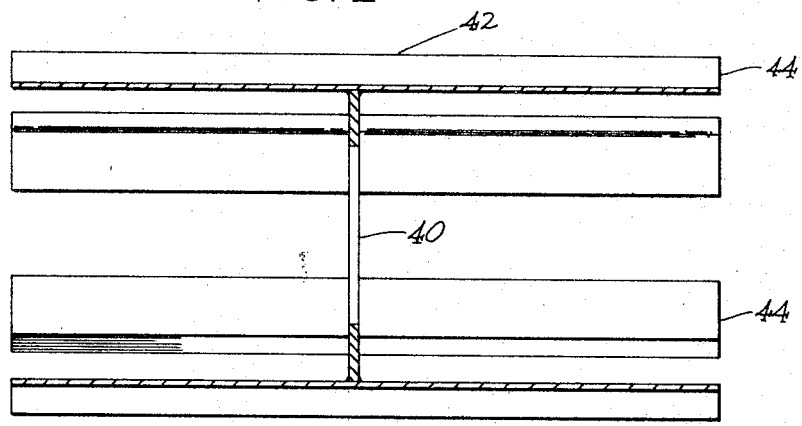
FIG. 6 is a sectional view of the assembly shown in FIG. 4.
Figure 5:
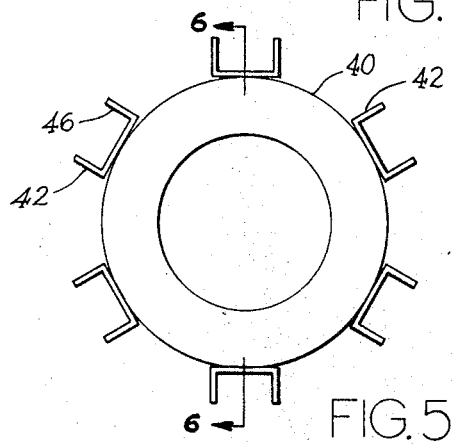
FIG. 5 is an end view of the assembly shown in FIG. 4.
Figure 4:
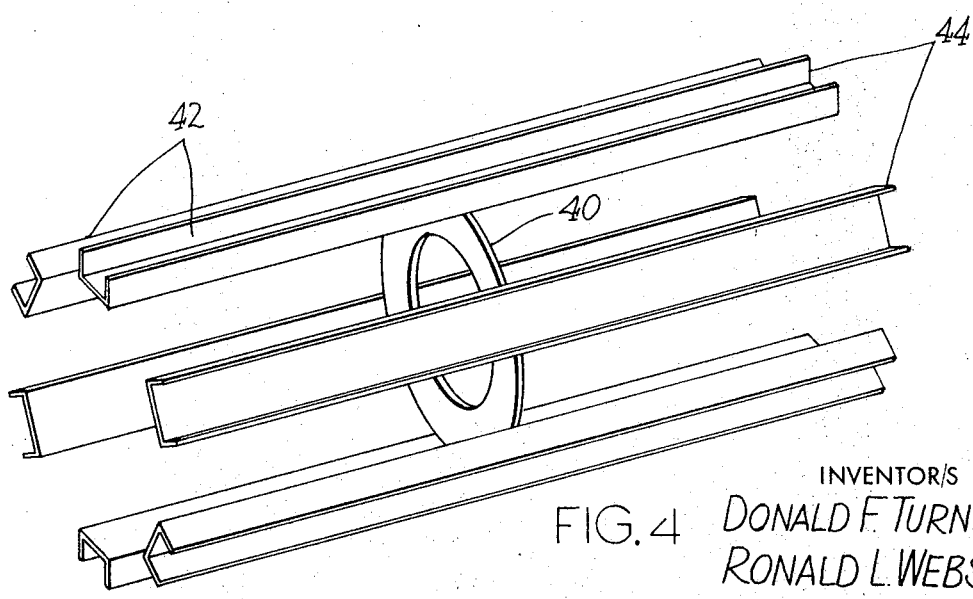
FIG. 4 is a perspective view of the spool showing the center brace and channel members thereabout.
Figure 10:
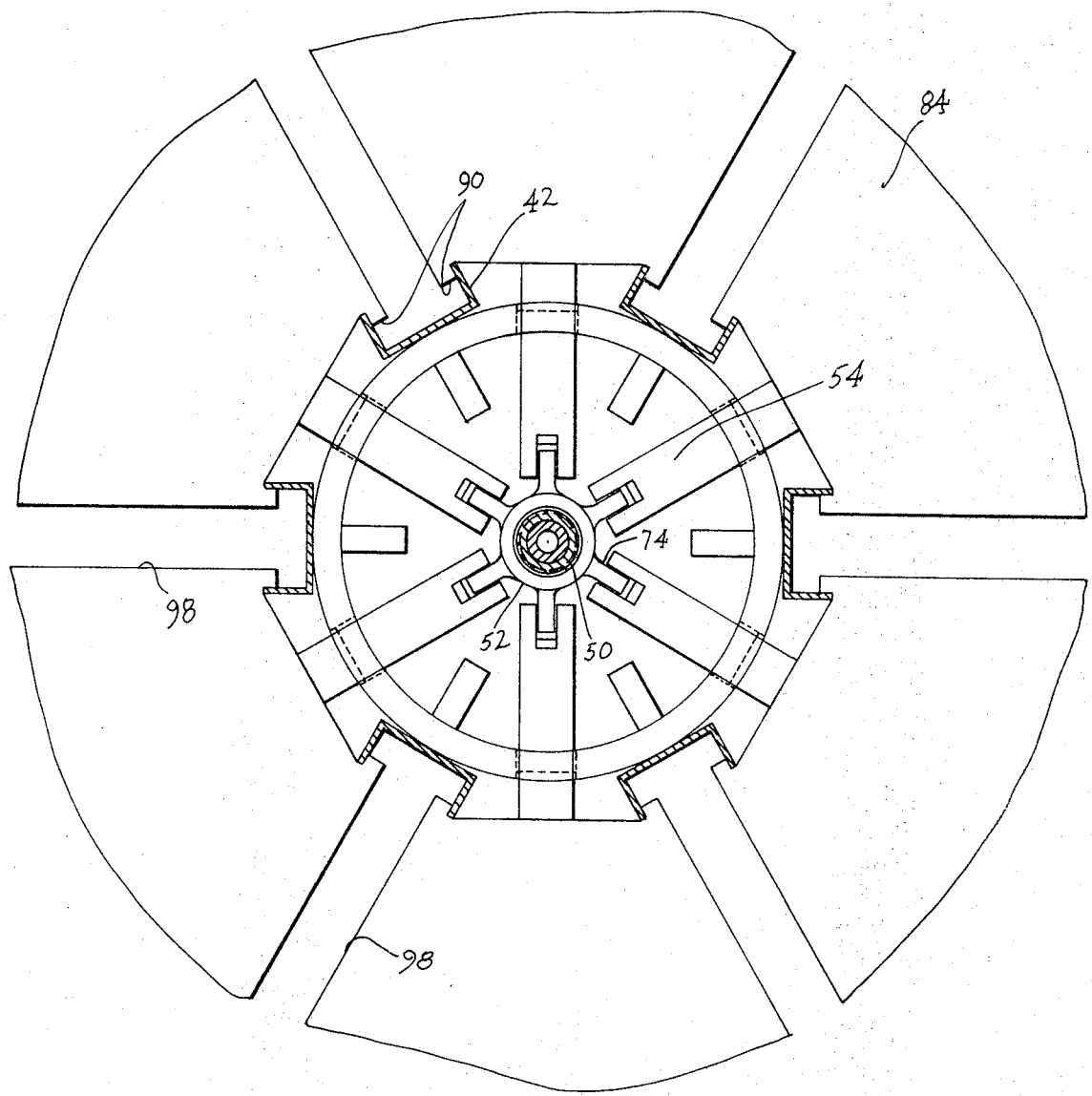
FIG. 10 is a sectional view taken along the line 10—10 of FIG. 1.

The spool portion of the reel is shown in detail in FIGS. 4–6. Specifically, FIG. 4 is a perspective view of the center brace 40 and a plurality of circumferentially spaced channel members 42. From the brief description earlier, it should be evident that the common ends 44 of said channel members 42 are seated in the channel recesses 36. By similarly fixing the opposite ends of these members, a cage-like appearance results. Despite the apparent independence of the several channel members, a strong and rigid structure is provided to receive coiled products thereabout such as steel wire.

The channel members 42, as seen in FIGS. 5 and 6, are shallow and tapered 46 to permit easy insertion and removal of suitable strapping elements. This design also affords strength to the spool without adding weight. However, it should be apparent that additional braces or stronger channel members may be used without departing from the scope of this invention.

The final major member of the apparatus described herein is illustrated in detail in FIGS. 7–10. FIG. 7 is an exploded sectional view showing the hub housing 48, release shaft 50, pawl 52 with abutting fingers 54, and removable flange 56. These elements combine in a manner to be described hereinafter to effect the locking of the flange 56.

Considering the several elements individually, it will be seen that the hub housing 48 is defined by an inside face 58 to which is fixed an annular or retainer ring 60. At spaced apart intervals about the circumference of ring 60 there is provided a plurality of apertures 61 through which fingers 54 are caused to move from an abutting position to a recessed position. The ring 60 actually is contained within the cage formed by the channel members 42.

The outside of the hub housing 48 is characterized by the axial portion 62 and central bore 64. Disposed within the bore 64 is release shaft 50 journaled in bearings 66 and 68 for easy turning, such as shown in FIG. 1. A portion of the inner end 70 of release shaft 50 is threaded 72 to engage pawl 52 shown in FIG. 8. Since the shaft 50 is fixed against axial movement, any turning of the shaft will cause the pawl 52 to move in the axial direction desired.

The outside of the pawl 52 is provided with a plurality of radial extensions 74. To each of said extensions, an abutting finger 54 is pivotally mounted by means of pins 76. While pivotally mounted, the fingers 54 are restricted in their movement, by means of the apertures 61, in a generally radial direction. While the function of the fingers will become more apparent in the description to follow, it will be observed that each said finger 54 is characterized by a forward abutting surface 78, and a rear abutting surface 80. The curved tip 82 ending with the rear abutting surface 80 is configured such as to facilitate the movement of the fingers 54 between the operative and inoperative positions.

The final element to be considered, and the one whereby the cooperation of the latter components will become apparent, is the removable flange 56. This flange is characterized by a forward face 84, and a cylindrical portion 86 having a central opening 88. The opening is sufficiently large to permit the axial movement of the flange over and clear of the hub housing 48. However, it will be recalled from the earlier description that the several channel members 42 are seated at their respective ends in suitable channel receiving slots. As a consequence of this arrangement, the central opening 88 is provided with a plurality of pairs of ribs 90 which are received in each said channel 42. This keying system assures the movement of the flange 56 with the remaining members.

The rear face 92 of the cylindrical portion 86 is the contact surface between the flange 56 and the forward face 78 of fingers 54. Thus, as rotational force is applied to release shaft 50 through the bore 64 by means of nut 94, causing the pawl 52 to move to the left (see FIG. 1), the fingers 54 will be extended to exert a holding pressure against the rear face 92 of flange 56. A reverse in this procedure results in the freezing of the flange 54 whereby it can be removed from the spool. To complement the structure and provide added strength, backing supports 96 are employed. This is particularly helpful since radial slots 98, corresponding to each said channel member 42 and slot 34, are found in the flange. By this alignment, it is possible to completely encircle the adjacent convolutions or strands of the coiled product in preparation for shipment.

Finally, since the break down reel of this invention, or in fact any reeling or unreeling operation, must be positioned to freely rotate, bearing members 100 and 102 have been provided. By mounting said bearings in suitable journals, the reel is ready for operation by means of drive gear 26.

Throughout the preceding description, no attempt has been made to restrict the terms "plurality" and "series," to a given quantity for the slots, channel members, etc. No quantity limitation was intended even though "six" is the preferred quantity illustrated in the several figures. That is, it should be obvious to those skilled in the art that variations from the preferred quantity may be necessary or desirable depending on the type of product to be coiled. Further, since it is not unusual in the coiling of products to use a cylindrical core, such as cardboard, it is contemplated by this invention that a sleeve or temporary core may be inserted on the spool. The inclusion of same would in no way affect the operation of the break down reel described herein.

In accordance with the description above, and as a result of modifications which may become apparent to those skilled in the art, no limitation is intended to be imposed herein except as set forth in the appended claims.

The embodiments of the invention in which an exclusive property or privilege is claimed are defined as follows:

1. In a system for the coiling and uncoiling of coiled products which includes a spool, a fixed flange, and a removable flange, the improvement comprising in combination therewith, the provision of a removable flange assembly comprising a hub secured to said spool, an annular flange projecting into said spool from said hub and containing a plurality of apertures, a circular flange adapted to slide over said hub and engage said spool whereby to expose a portion of said circular flange to said apertures, a plurality of abutting elements operable to move in a substantially radial direction through said apertures to engage said portion, and means to effect the movement of said abutting elements.

2. The structure claimed in claim 1 wherein said hub is provided with a central bore, and a threaded shaft mounted therein for rotational movement.

3. The structure claimed in claim 2 including a pawl threadably engaged with said shaft, whereby said pawl is adapted to move axially along said shaft.

4. The structure claimed in claim 3 wherein said pawl is provided with a plurality of radial projections for pivotally mounting said abutting elements.

5. The structure claimed in claim 1 wherein said spool comprises a series of U-shaped channel members arranged such that the opening of each of said members extends outwardly.

6. The structure claimed in claim 5 wherein each said flange member is provided with radially directed slots aligned with said channel members.

7. The structure claimed in claim 1 including a gear for driving the assembly.

References Cited

UNITED STATES PATENTS

| | | | |
|---|---|---|---|
| 1,400,936 | 12/1921 | Bull. | |
| 2,971,721 | 2/1961 | Jones | 242—110.2 |
| 3,201,061 | 8/1965 | Volk | 242—115 |

GEORGE F. MAUTZ, Primary Examiner

U.S. Cl. X.R.

242—115, 118.6